W. M. & S. M. ELSOM.
BICYCLE LEADER.
APPLICATION FILED JUNE 20, 1910. RENEWED JULY 24, 1911.
1,002,507.
Patented Sept. 5, 1911.
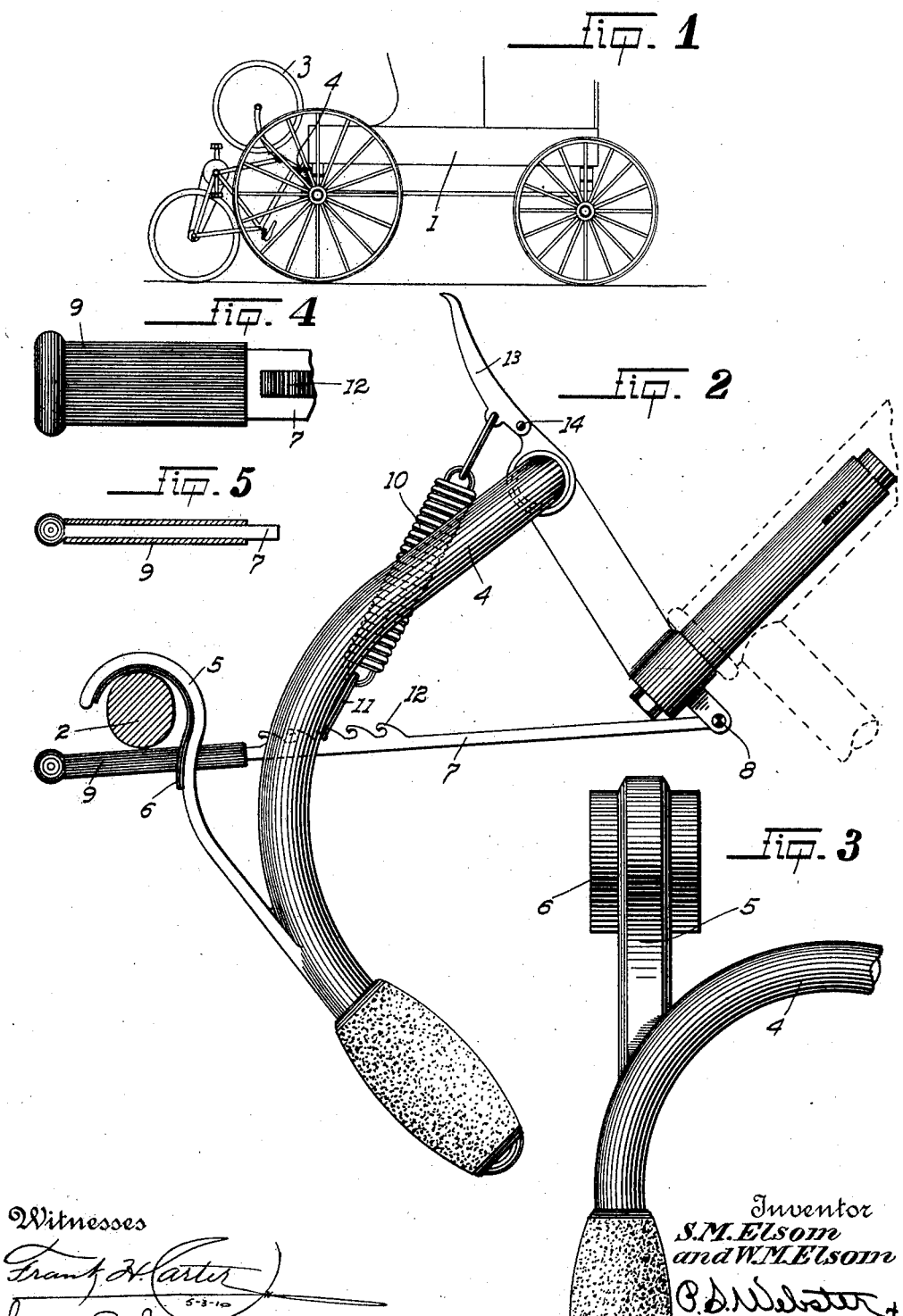

UNITED STATES PATENT OFFICE.

WILLIAM M. ELSOM AND SAMUEL M. ELSOM, OF SANTA CRUZ, CALIFORNIA.

BICYCLE-LEADER.

1,002,507. Specification of Letters Patent. Patented Sept. 5, 1911.

Application filed June 20, 1910, Serial No. 567,827. Renewed July 24, 1911. Serial No. 640,358.

*To all whom it may concern:*

Be it known that we, WILLIAM M. ELSOM and SAMUEL M. ELSOM, citizens of the United States, residing at Santa Cruz, in the county of Santa Cruz, State of California, have invented certain new and useful Improvements in Bicycle-Leaders; and we do declare the following to be a full, clear, and exact description of the same, such as will enable others skilled in the art to which it appertains to make and use the same, reference being had to the accompanying drawings, and to the characters of reference marked thereon, which form a part of this application.

This invention relates to livery or automobile paraphernalia and particularly to a means for attaching and leading a bicycle to the rear of a vehicle to be delivered from a stable or garage whereby the person so delivering the same will have a means of return conveyance to obviate the necessity of walking back after having so delivered such vehicle.

The present invention particularly relates to a means for so attaching such bicycle to the rear of the vehicle as to cause the same to ride securely and easily and to be easily unfastened when desired.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claims.

In the drawings similar characters of reference indicate corresponding parts in the several views.

Figure 1 is a side elevation of a vehicle showing our improved bicycle leading means attached thereon. Fig. 2 is a side elevation of the handles of a bicycle showing the attachment thereon. Fig. 3 is a fragmentary view of a handle bar showing a gripping jaw thereon. Fig. 4 is a fragmentary top plan view of a tension gripping bar. Fig. 5 is a side view of the same showing a leather covering thereon in section.

Referring now more particularly to the characters of reference on the drawings 1 designates a vehicle having the usual rear supporting axle 2.

3 designates a bicycle having handle bars 4 which handle bars proper are of the usual form but for the purposes of our invention we provide on each bar a projecting hand like gripping jaw 5 having an inner leather covering 6. In practice the bicycle is turned up on one end to ride on its rear wheel as shown in Fig. 1 the jaws 5 resting on the upper side of the axle 2, the leather 6 preventing frictional wear. These jaws 5 are held in such position during operation by means of a bar 7 pivotally mounted at the center of the bars 4 as at 8 and having an outer leather covering 9 which bears against the under side of the axle 2 and is held in frictional contact therewith by reason of a spring 10 having a ring or loop 11 which engages one of a plurality of hooks 12 on the bar 7 at one end and at its other end is secured to a lever handle 13 pivotally mounted at 14 to the center of the bars 4 which lever handle 13 is operated to extend the spring 10 to hold the bar 7 against the axle 2 to maintain said jaws 5 in position or to release said spring to permit said bar to move away from said axle 2 to allow the bicycle to be taken from the vehicle for use as set forth.

From the foregoing description it will be easily seen that the bicycle can be readily attached to any vehicle and when the said vehicle has been delivered to its destination the bicycle can be removed and used for the return trip. The plurality of hooks 12 permit of the device being adjusted to fit any size or style of axle.

From the foregoing description it will be readily seen that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:

1. A device of the character described comprising a vehicle, a bicycle, projecting jaw members on said bicycle adapted to engage the axle of said vehicle, a bar mounted on said bicycle and adapted to engage said axle on the side opposite said jaws, means for holding said bar in frictional contact with said axle, and means for releasing the same.

2. A device of the character described comprising a bicycle having two projecting jaws, a bar projecting from said bicycle opposite said jaws, a lever handle on said bicycle, and a tension means adapted to connect said bar and said handle.

In testimony whereof we affix our signatures in presence of two witnesses.

WILLIAM M. ELSOM.
SAMUEL M. ELSOM.

Witnesses:
P. C. MERCIER,
L. A. KELLER.

Copies of this patent may be obtained for five cents each, by addressing the "Commissioner of Patents, Washington, D. C."